March 30, 1937.  E. J. ALBERTI  2,075,157
COMBINED ROLLING PIN AND DIE
Filed Nov. 2, 1934
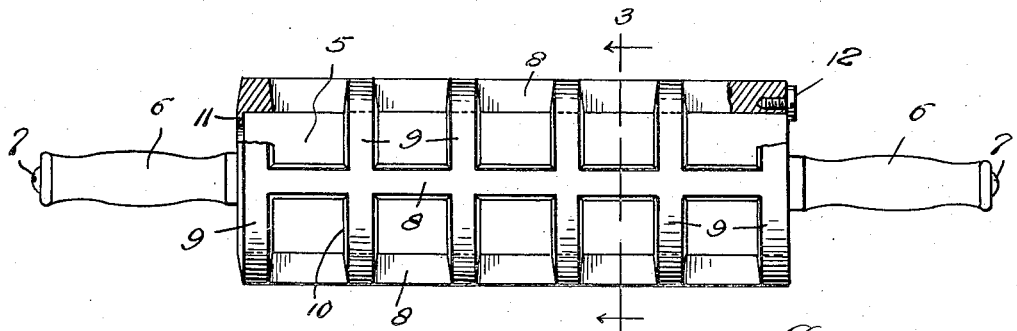
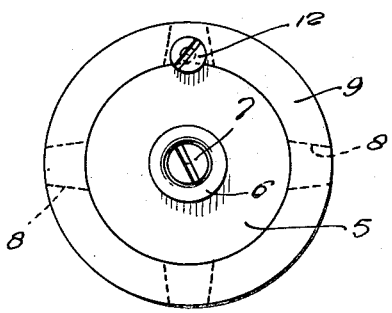
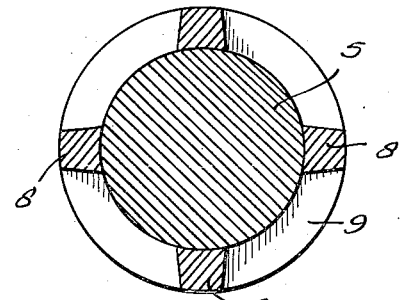
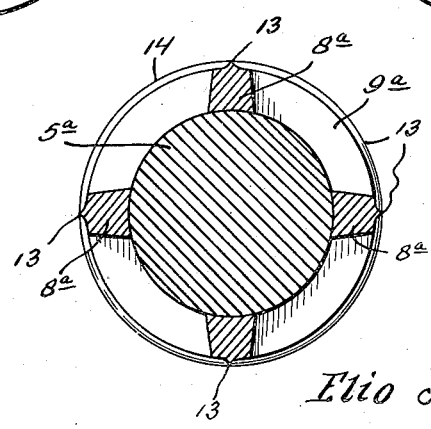
Inventor
Elio Joseph Alberti,
By J. Stanley Burch
Attorney Patented Mar. 30, 1937

2,075,157

UNITED STATES PATENT OFFICE 2,075,157

COMBINED ROLLING PIN AND DIE

Elio Joseph Alberti, Chicago, Ill.

Application November 2, 1934, Serial No. 751,236

1 Claim. (Cl. 107—51)

This invention relates generally to rolling pins of the type commonly employed for domestic use in rolling out dough in the production of various baked articles, and has more particular reference to the combination with such a rolling pin of a die fitted over the rolling pin body and comprising a plurality of intersecting and uniformly spaced broad-faced longitudinal bars and annular rings coacting with each other and with the surface of the rolling pin body to form a series of suitably shaped pockets, whereby, through a rolling operation, the combined device may be employed to produce at each rolling or dieing operation a plurality of biscuit, cake or like formations having "sealed" or compressed thin edges which will be properly cooked to a crust-like nature when subsequently baked. The "sealing" or compression of the edges of the articles produced is especially desirable when such articles are in the nature of cakes or the like having a center or filling of normally soft or fluent material arranged between two layers of dough, in which the layers of dough are compressed together at the edges of the articles so that the filling is effectively retained and sealed within the casing formed by the dough layers. While the broad-faced bars and rings forming the die may have perfectly flat faces so that the plurality of biscuit, cake or like formations are normally joined by thin connecting webs which permit them to be readily broken apart after baking, such bars and rings may be provided with central raised cutting edges adapted to cut through these thin connecting webs and divide or separate the biscuit, cake or like formations prior to the baking operation. The important distinction between the present invention and prior devices of this general nature, therefore, is that the bars and rings forming the die are broad-faced and thereby purposely designed to perform a compressing function on the dough or the like being rolled, rather than being in the nature of thin plates or rings serving primarily and substantially entirely as cutters adapted to readily pass through and cleanly sever the dough or the like into biscuit, cake or like formations whose edges are not compressed or sealed to a noticeable or material extent.

A further object of the present invention is to provide a simple die for use in connection with ordinary rolling pins to function as above described, and capable of being readily removed from the rolling pin to permit use of the latter in the ordinary way.

Other objects and features of the invention will become apparent from the following description when considered in connection with the accompanying drawing, in which:

Figure 1 is an elevational view, partly broken away and in section, of a conventional rolling pin equipped with a die constructed in accordance with the present invention.

Figure 2 is an end elevational view looking toward the left of Figure 1.

Figure 3 is a transverse section on line 3—3 of Figure 1.

Figure 4 is a view similar to Figure 3 showing a modified form of die embodying the present invention; and Figure 5 is a sectional view showing a plurality of connected filled cake or like formations produced by use of the present invention.

Referring in detail to the drawing, 5 represents the body of an ordinary rolling pin such as commonly employed for domestic use, said body being usually in the form of a wooden cylinder having axially disposed handles or hand grips 6 attached to its ends by suitable means such as screws 7 driven into the ends of the body 5 and upon which the handles or hand grips 6 are freely revoluble.

The rolling die forming part of the present invention consists of an apertured metallic cylinder, preferably in the nature of a one-piece casting and comprising a plurality of intersecting and uniformly spaced broad-faced longitudinal bars 8 and annular rings 9 coacting to provide a series of apertures of rectangular or other suitable shape as at 10. The longitudinal bars 8 and annular rings 9 are thus integrally joined and have the broad outer faces thereof flush with each other. Also, this cylindrical element or casting is of an internal diameter to snugly fit over the body 5 of the rolling pin, as well as being of a length substantially equal to said body of the rolling pin. Thus, when the casting or unit is fitted on the body of the rolling pin, it coacts with the surface of said rolling pin body at the openings 10 to form a series of suitably shaped pockets. While the cylindrical casting or unit constituting the die may tightly frictionally fit upon the body of the rolling pin to be prevented from rotary or longitudinal accidental displacement relative to said body of the rolling pin, it is preferably positively secured in place. Any positive securing means may be employed, such as an inwardly projecting annular flange 11 on one end of the die adapted to abut the adjacent end of the rolling pin body 5, and a securing screw 12 is threaded into one of the longitudinal bars 8 at the opposite end of the die so that its head engages and overlaps the opposite end of the rolling pin body 5. Obviously, upon removal of the securing screw 12, the die may be slipped endwise off of the rolling pin body, thereby permitting use of the rolling pin without the die in the usual way.

Due to the broad outer faces of the bars 8 and rings 9, the combined device consisting of the rolling pin with the die on the body thereof may be employed, through a rolling operation, to produce a plurality of biscuit, cake or like formations having the edges thereof sealed or compressed and connected together by thin compressed webs. In other words, the dough or the like being rolled will enter the pockets at the openings 10 to form the plurality of biscuit, cake or like formations, while the dough or the like between these formations will be compressed by the broad-faced bars 8 and rings 9 so as to produce the sealed or compressed thin edges of said formations and the thin compressed connecting webs between the latter.

In the construction of Figures 1 to 3 inclusive, the broad outer faces of the bars 8 and rings 9 are flat so that the biscuit, cake or like formations may be left connected until after being baked, whereupon they may be readily broken apart or separated in any desired or preferred way. However, such formations may be completely separated while being formed, by providing the broad outer faces of the bars 8 and rings 9 with central cutting edges or raised cutting ribs 13 and 14, as shown in Figure 4. In the latter figure the bars and rings of the die are respectively indicated at 8a and 9a, while the body of the rolling pin upon which this die is placed is indicated at 5a.

While the present invention may be employed to advantage in the production of all kinds of plain biscuit, cake or like formations, it is particularly serviceable in the production of articles in the nature of cakes or the like having a center or filling of normally soft or fluent material, such as jelly, icing, etc., arranged between two layers of dough. In the production of such filled articles, a rolled sheet of dough as indicated at 15 in Figure 5 may be placed upon a flat surface, after which the filling material may be spread upon the upper surface of this sheet of dough. A second sheet of dough as indicated at 16 may then be placed over the filling material, after which the rolling pin with the die positioned thereon may be passed over the composite body of dough and filling material so that the latter will enter the openings of the die to produce the plurality of cake or like formations as indicated at 17, the two layers of dough being pressed together and rolled thin by the bars 8 and rings 9 to produce the thin connecting web 18 between the cake or like formations. In this way, the cake or like formations are provided with sealed or compressed edges where the dough layers are joined together and rolled thin. Thus, the filling of each cake or like formation is completely encased in dough and effectively retained and sealed within the dough casing. Due to the compressed and thinned edges of the formations and the compressed and thin nature of the connecting webs therebetween, they will be thoroughly baked to crust-like condition in the subsequent ordinary baking operation. When the plain or flat-faced bars and rings are used, the connecting webs may remain intact until the entire batch of formations is baked, after which such formations may be readily separated or broken apart. On the other hand, when the die used is provided with the raised cutting ribs or edges 13 and 14, the cake or like formations will be severed from each other during the rolling operation centrally of the thin connecting webs, thereby rendering it unnecessary to separately perform a separating or cutting operation after baking in order to separate the several baked cake or like formations.

From the foregoing description, it is believed that the construction, manner of use, and advantages of the present invention will be readily understood and appreciated by those skilled in the art. Minor changes in the details of the invention as illustrated and described are contemplated within the spirit and scope of the invention as claimed.

What I claim as new is:

A die of the character described, comprising a hollow cylinder adapted to snugly fit over the body of a conventional domestic rolling pin and cast in one piece with a thick cylindrical wall of uniform thickness, said cylindrical wall being formed with a plurality of similar apertures uniformly spaced to define integrally connected broad-faced longitudinal bar and circumferential ring members therebetween, said cylinder having an integral inwardly projecting annular flange at one end arranged to abut one end of the rolling pin body and limit movement of said cylinder onto the latter, and a screw threaded into one of said longitudinal bar members at the other end of said cylinder and having its head engaged with the other end of the rolling pin body to removably secure said cylinder on the latter.

ELIO JOSEPH ALBERTI.